US006847602B2

(12) United States Patent
Sonu (10) Patent No.: US 6,847,602 B2
(45) Date of Patent: Jan. 25, 2005

(54) DATA DETECTION IN OPTICAL DISK DRIVES USING DECISION FEEDBACK EQUALIZATION

(75) Inventor: Gene Sonu, San Jose, CA (US)

(73) Assignee: Zoran Corporation, Sunnyvale, CA (US)

(*) Notice: Subject to any disclaimer, the term of this patent is extended or adjusted under 35 U.S.C. 154(b) by 30 days.

(21) Appl. No.: 10/246,862

(22) Filed: Sep. 18, 2002

(65) Prior Publication Data

US 2004/0052189 A1 Mar. 18, 2004

(51) Int. Cl.[7] .............................................. G11B 5/76
(52) U.S. Cl. ............................. 369/59.21; 369/124.11
(58) Field of Search ........................ 369/47.25, 47.15, 369/47.17, 53.31, 53.33, 59.15, 59.16, 59.21, 124.01, 124.1, 124.11, 124.13

(56) References Cited

U.S. PATENT DOCUMENTS 5,572,503 A * 11/1996 Satoh et al. .............. 369/47.17
6,600,779 B1 * 7/2003 Sawada et al. ............. 375/233

OTHER PUBLICATIONS

John G. Kenney and Roger Wood; Multi–level Decision Feedback Equalization: An Efficient Realization of FDTS/DF; Mar. 1995, IEEE Transactions On Magnetics. vol. 31.; 6 pages.

Jan Bergmans, 6.6 Decision–Feedback Equalization for Run–Length–Limited Codes; *Digital Baseband Transmission and Recording;* Kluwer Academic Publishers, 1996; pp. 287–290.

* cited by examiner

*Primary Examiner*—Paul W. Huber
(74) *Attorney, Agent, or Firm*—Blakely Sokoloff Taylor & Zafman; Judith A. Szepesi (57) ABSTRACT

A method and apparatus in an optical disk system employing a decision feedback equalization (DFE) technique to provide a boosted signal resolution at a data slicer input while minimizing noise. In one embodiment, an optical equalizer includes a feed forward equalizer (FFE) that equalizes the signal from the optical disk and provides an equalized signal and a feedback equalizer (FBE) that generates a feedback signal. The feedback signal is subtracted from the equalized signal to provide a signal having increased resolution and low noise, which is then applied to a data slicer. In one embodiment, the boost provided by the FFE is lower than in conventional equalizers to minimize noise. As the boost of the FFE is reduced, the number of taps in the FBE is increased to provide optimized system performance.

13 Claims, 7 Drawing Sheets

DATA DETECTION IN OPTICAL DISK DRIVES USING DECISION FEEDBACK EQUALIZATION

BACKGROUND OF THE INVENTION

1. Field of the Invention

The disclosure relates generally to disk drive systems, and specifically to optical disk drive circuitry for improving data detection.

2. Background of the Invention

Over the past decade, there has been a tremendous shift in portable storage from magnetic "floppy" disks to optical disks such as compact discs (CDs) and digital versatile discs (DVDs). The advantages of optical discs over their magnetic counterpart are numerous including the ability to store an enormous amount of data, making it ideal for storing large files and programs, music, movies, etc.

An important consideration in optical disk drives, and really all disk drives, is the access time, which is directly related to how fast the disk spins. That is, as the disk spins faster, the access time for reading and/or writing data is reduced. There has been much effort, in terms of time and money, in reducing the access times for optical disk drives.

Data is stored on an optical disk in the form of microscopic pits (referred to as mark for DVD) and lands (referred to as space for DVD) which separate neighboring pits. As the disk spins, pits and lands pass under a laser beam and reflect the laser beam at varying intensities. The reflected laser beam is detected by an optical pick-up unit (OPU) and, in response thereto, produces a stream of "1's" and "0's" representing a "pick-up" signal.

As optical disk drive speeds continues to increase, the components in optical disk drives such as the OPU and media become more band-limited. As a result, the OPU "pick-up" signal suffers resolution loss. Resolution may be defined as the ratio between the maximum and minimum peaks in the "pick-up" signal. For example, it has been observed in at least one commercial DVD drive that the signal resolution is 20% at the DVD 16× speed.

Optical disk drives typically employ an equalizer to boost the resolution of the "pick-up" signal. In at least one application, the minimum resolution required to detect the smallest mark is found to be about 50%, which means that the equalizer boost may have to be as big as 8 dB (=20 $\log_{10}(50\%/20\%)$). To achieve a signal resolution of about 50% at a data slicer input, it has been determined that an equalizer transfer function as expressed below in equation (1) provides good equalization.

$$H(D)=1+2D+3D^2+2D^3+D^4. \tag{1}$$

This may be referred to as PR12321 equalization. However, by boosting the "pick-up" signal, the equalizer is also boosting the noise at the data slicer input, thereby degrading the data slicer performance.

One method for boosting the resolution of the "pick-up" signal while attempting to minimize noise includes employing a Partial Response Maximum Likelihood (PRML) technique. The PRML utilizes a Finite Impulse Response (FIR) digital filter and a Viterbi Detector (VD). The PRML technique provides reliable detection in the sense of the least mean squared error technique. One drawback of this technique, however, is the hardware complexity resulting from the speed limitation imposed by the required Add-Compare-Select ("ACS") operation and the path memory length required for the algorithm convergence.

BRIEF SUMMARY OF THE INVENTION

In one embodiment, a decision feedback equalizer in an optical disc system includes a feedforward equalizer (FFE) coupled to receive a pick up signal sensed from an optical disc and a feedback equalizer (FBE). An output of the FFE is coupled to a positive terminal of a subtractor while an output of the FBE is coupled to a negative terminal of the subtractor. An output of the subtractor is coupled to an input of a data slicer. The input and an output of the data slicer are coupled to the FBE.

Other embodiments are disclosed and claimed herein.

DETAILED DESCRIPTION

Disclosed herein is a method and apparatus utilized in an optical disk system that employs a Decision Feedback Equalization (DFE) technique to provide a boosted signal resolution at a data slicer input while minimizing noise.

Figure 1:
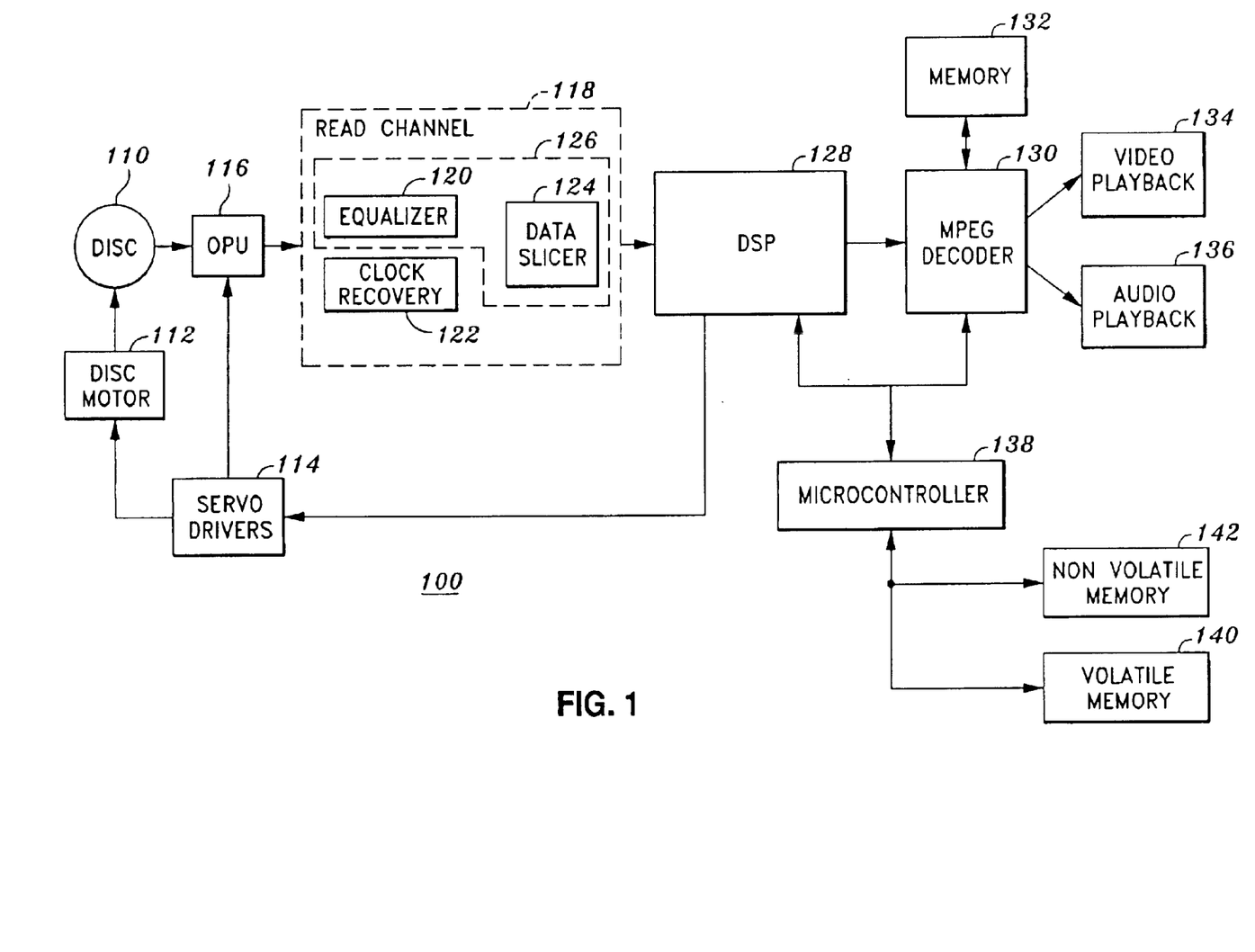
FIG. 1 illustrates a block diagram of an exemplary digital playback system incorporating one or more embodiments disclosed herein.

FIG. 1 illustrates a block diagram of an exemplary digital playback system 100 incorporating one or more embodiments disclosed herein. The digital playback system 100 allows playback of optical disks such as compact discs (CDs) and digital video or versatile discs (DVDs), which may include data, audio, video, and combinations thereof.

Referring to FIG. 1, the digital playback system 100 includes an optical disc 110, an optical disc motor 112 that rotates the optical disc 110, servo drivers 114 that control the speed of the disc motor 112, and an optical pickup unit (OPU) 116 that senses information stored on the optical disc 110 and generates a signal in response thereto. In the case of CDs, the information stored on the optical disc 110 is in the form of pits. The OPU 116 includes circuitry, typically a laser (e.g., single beam, triple beam, etc.), for sensing the pits on the optical disc 110. The arrangement of pits on CDs is different from the arrangement of marks on DVDs. Consequently, the OPU 116 is capable of sensing different arrangements of pits and marks on the optical disc 110. It is contemplated that the digital playback system 100 may include more than one optical disc.

The OPU 116 is coupled to a read channel 118 and provides the pick up signal to the read channel 118. In one embodiment, the pick up signal is an analog signal. The read channel 118 includes, among other components, an equalizer 120 and a data slicer 124, which together form a decision feedback equalizer (DFE) 126 of the present disclosure, and a clock recovery block 122. The clock recovery block 122 is typically a Phase Lock Loop (PLL) which recovers a clock signal from the pick up signal. The recovered clock signal is transmitted to the DFE 126. The equalizer of the DFE 126 boosts the pickup signal while minimizing noise and the data slicer 124 detects signal transitions containing the transmitted data and generates a digital data stream. The output of the data slicer 124 is coupled to a digital signal processor (DSP) 128 which, among other things, provides signal processing functionality. The DSP 128 can process the signal into different formats such as formats compatible with CDs and DVDs. More specifically, for DVDs, the DSP 128 may provide synchronization, 16-to-8 demodulation (and other demodulation) of DVD data, ECC error correction, descrambling, EDC and IED detection, authentication (e.g., CSS, CPPM, CPRM), and buffer management. For CDs, the DSP 128 may provide analog to digital conversion, demodulation (e.g., Eight-to-Fourteen "EFM" demodulation), and error correction. The DSP 128 also provides memory resources for facilitating signal processing functionality. In one embodiment, the read channel 118 is implemented on a single integrated circuit. In another embodiment, the read channel 118 and DSP 128 are implemented on a single integrated circuit.

Additionally, the DSP 128 includes servo and disc motor control functionality. In particular, the DSP 128 recognizes errors in the pick-up signal, generates error signals in response thereto, and transmits the error signals to the servo drivers 114. Examples of error signals include spindle motor control, optical pickup, focus, and tracking (of OPU 116). The DSP 128 calculates servo error control signals, which typically include a focus error signal, tracking error signal, and a track-crossing pulse signal. The DSP 128 may calculates several closed-loop servos, including a disc motor servo, focus servo, and tracking servo. Based on the servo error control signals, the DSP 128 outputs control voltages to the servo drivers 114 to correct the rotation speed, to move the sled which houses the OPU 116 to the proper track, to move up or down the OPU 116 to a proper distance from the disc, or to correct the off-track error. It is contemplated that servo and disc motor control functionality may be implemented external to the DSP 128.

The DSP 128 further provides an interface to an MPEG decoder 130. The digital output stream outputted from the DSP 128 to the MPEG decoder may be in one of a number of formats including, but not limited to, compact disc digital audio (CD-DA) data, as defined by the Red Book standard, compact disc read-only memory (CD-ROM) data, as defined by the Yellow Book standard, or an MPEG program stream. The DSP 128 handles CD/DVD bit streams, including support of special effects. The MPEG decoder 130 is coupled to a memory 132, video playback subsystem 134, and audio playback subsystem 136.

The MPEG decoder 130 decodes the data stream received from the DSP 128, converts it into video data and/or audio data, in one of a number of selected formats, for output to video and audio subsystems 134 and 136, respectively. In one embodiment, the MPEG decoder 130 is an MPEG-II decoder which receives a MPEG-II data stream from the DSP 128 and converts the data stream into digital audio and video outputs. MPEG decoder 130 extracts timing information from the MPEG data stream, and de-multiplexes the compressed MPEG data stream into decompressed audio and video data streams. The MPEG decoder 130 generally includes a MPEG audio decoder, which decompresses and decodes the compressed MPEG audio stream to produce a decompressed audio data stream, and a MPEG video decoder which decompresses and decodes the compressed MPEG video data stream to produce a decompressed video data stream. The decompressed video and audio streams may then be forwarded to video and audio playback subsystems 134 and 136 for playback. The timing information extracted by the MPEG decoder 130 is used to synchronize the audio and video outputs. The optional memory 132 provides memory resources for the decoding process.

Coupled to the DSP 128, MPEG decoder 130, and other devices is a microcontroller 138 for controlling the operation of the digital playback system 100. It is to be appreciated that a microprocessor, gate array, or other device(s) may be used instead of the microcontroller as the central processing unit of the digital playback system 100. The microcontroller 138 may be coupled to volatile memory 140 (and/or internal volatile memory, not shown) for executing instructions, storing data and variables, etc. A non-volatile memory 142 such as a read-only memory (ROM), Flash, etc. stores program code for execution by the microcontroller 138 to control operation of the digital playback system 100. The program code, stored in non-volatile memory 142, may be loaded into volatile memory 140 at startup for execution by microcontroller 138. The microcontroller 138 may also be coupled to a CPU (not shown) of the entire system in which digital playback system 100 is implemented for communication therewith.

Figure 2:
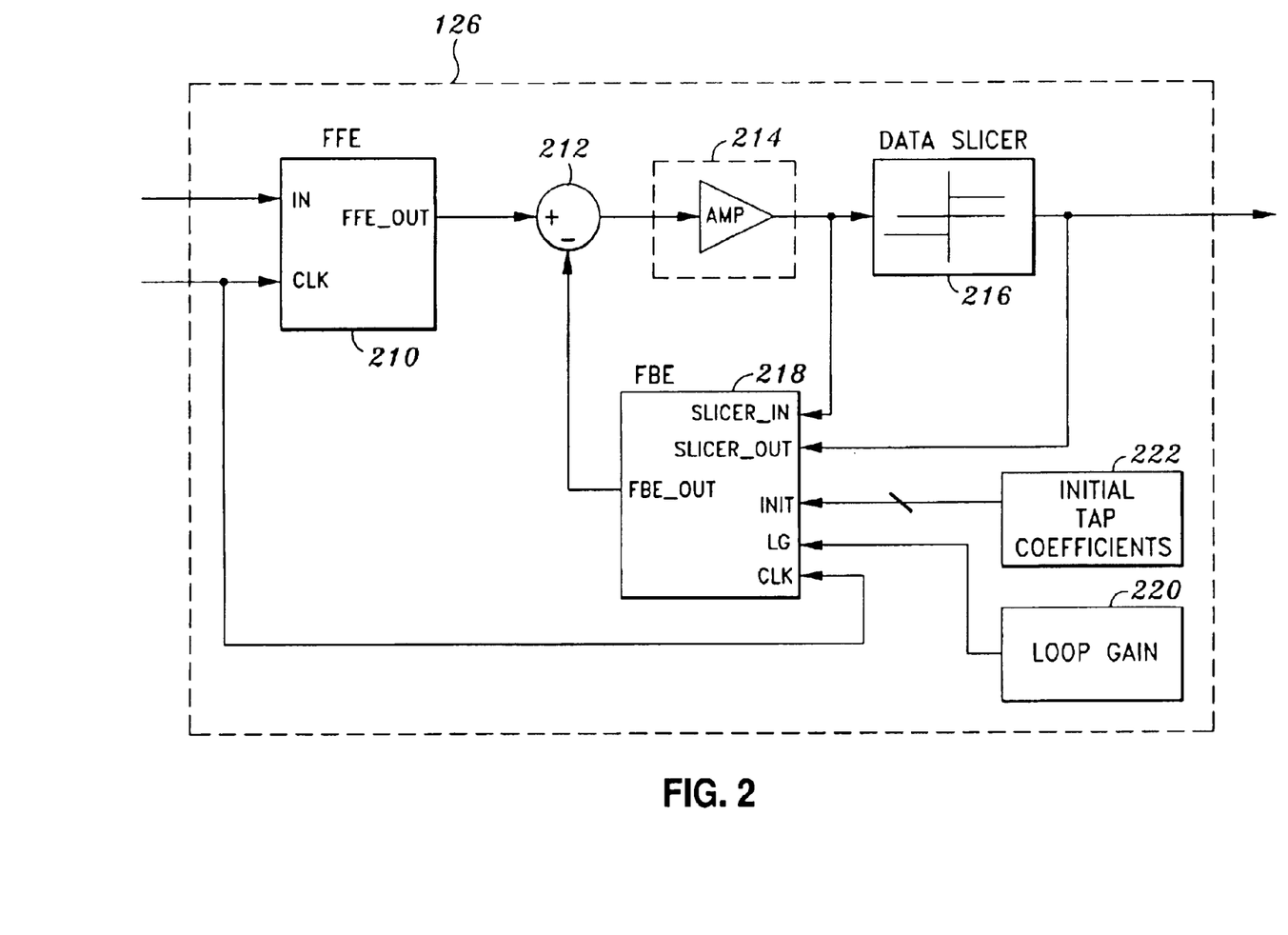
FIG. 2 is a block diagram of a decision feedback equalizer according to one embodiment.

FIG. 2 is a block diagram of a decision feedback equalizer 126 according to one embodiment of the present disclosure. Referring to FIG. 2, the decision feedback equalizer includes two equalizers, namely, a feed-forward equalizer (FFE) 210 and a feedback equalizer (FBE) 218. The FFE 210 receives and boosts the analog signal sensed by the OPU 116 from the optical disc 110. Also provided to the FFE 210 and other circuits is a clock signal recovered by the PLL in the clock recovery block 122 (FIG. 1). The FFE 210 equalizes the analog signal to boost the signal resolution, where resolution is defined as the ratio between the maximum and minimum peaks of the signal. In one embodiment, the FFE 210 target function is chosen such that the boost is not very strong, as compared to prior art equalizers (as expressed by the transfer function in equation (1)), to minimize noise. In one embodiment, in order to provide an effective equalization such as PR12321 equalization at the data slicer input, the target impulse response for the FFE 210 is selected as follows:

$$H(D)=2+4D+6D^2+5D^3+3D^4+2D^5. \quad (2)$$

Figure 3:
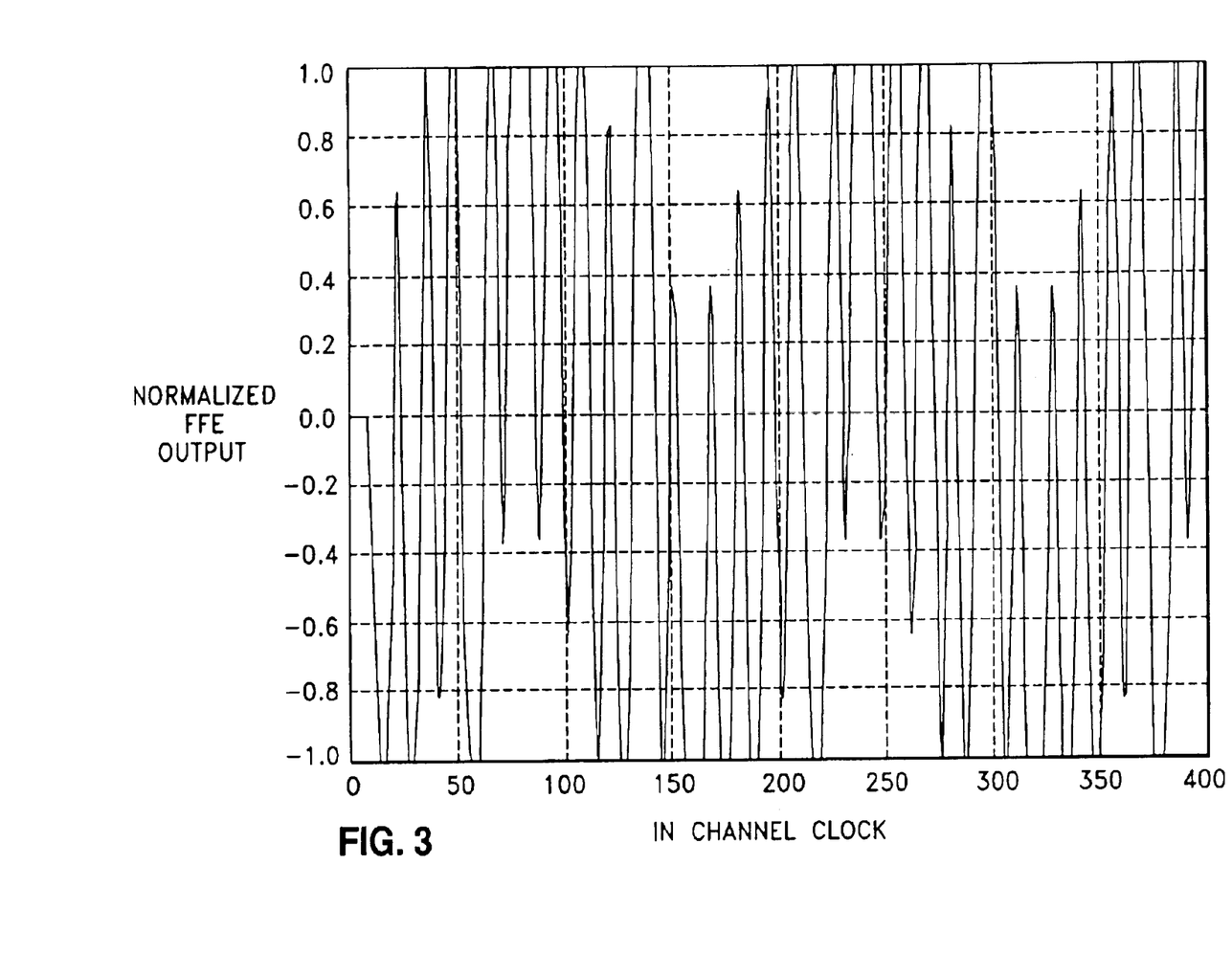
FIG. 3 is a graph of an output of the FFE of FIG. 3.

FIG. 3 is a graph showing the output of the FFE 210, based on the target function of equation (2). The target function (2) produces an output signal having a resolution of about 35%, which is a weaker signal boost than in the conventional equalizer. By providing a weaker resolution, the FFE 210 also provides weaker noise boost.

Continuing to refer to FIG. 2, the output of the FFE 210 is coupled to a positive terminal of a subtractor 212 and the output of the FBE 218 is coupled to a negative terminal of the subtractor 212. The outputs of the subtractor 212 (or optional amplifier 214 if provided) and data slicer 216 are coupled to the FBE 218 as inputs. Other values such as loop gain 220 and initial tap coefficients 222, which may be fixed, are also inputs to the FBE 218. The subtractor 212 subtracts the feedback signal of the FBE 218 from the incoming signal of the FFE 210 and provides a signal having sharp transitions with an effective signal resolution of about 50% at the input of the data slicer 216. An optional amplifier 214 may be used between the output of the subtractor 212 and input of data slicer 216 to boost the signal level, e.g., if needed. The data slicer 216 detects the signal transitions and outputs a digital bit stream of "0's" and "1's" in response. In essence, the data slicer 216 functions as one bit analog to digital converter. When the signal at the input of the data slicer is negative or zero, the output of the data slicer is a logic "0" and when the signal at the input of the data slicer is positive, the output of the data slicer is a logic "1."

In one embodiment, the target function of the FFE 210 is chosen such that the resolution of the boosted signal is between approximately 20% to 50%. In another embodiment, it is contemplated that the resolution of the boosted signal may be lower than 20% or greater than 50%. The selection of the target function may also affect the number of taps utilized in the FBE 218. In the case of the target function (2) of the FFE 210, the number of tap coefficients utilized by the FBE 218 is three to provide an effective PR12321 equalization at the input of the data slicer 216. It is to be appreciated that the OPU pickup signal may be weaker due to poor frequency response of the OPU, possibly yielding a signal resolution below 20%. In such a situation, a weaker signal boost by the FFE 210 (e.g., weaker than 35% resolution) may be desirable to minimize noise boost. As a result of the weaker signal boost, the FFE 210 transfer function will generally have higher order polynomials. To compensate for the higher order polynomials, more taps in the FBE 218 may be necessary (e.g., 4 or more taps). On the other hand, if the OPU has a good frequency response, yielding a signal resolution greater than 20%, it may be desirable to provide a stronger signal boost by the FFE (e.g., stronger than 35% resolution). In such a case, it may be possible to reduce the number of taps in the FBE (e.g., 2 or less taps) and thus less hardware in the FBE.

Figure 4:
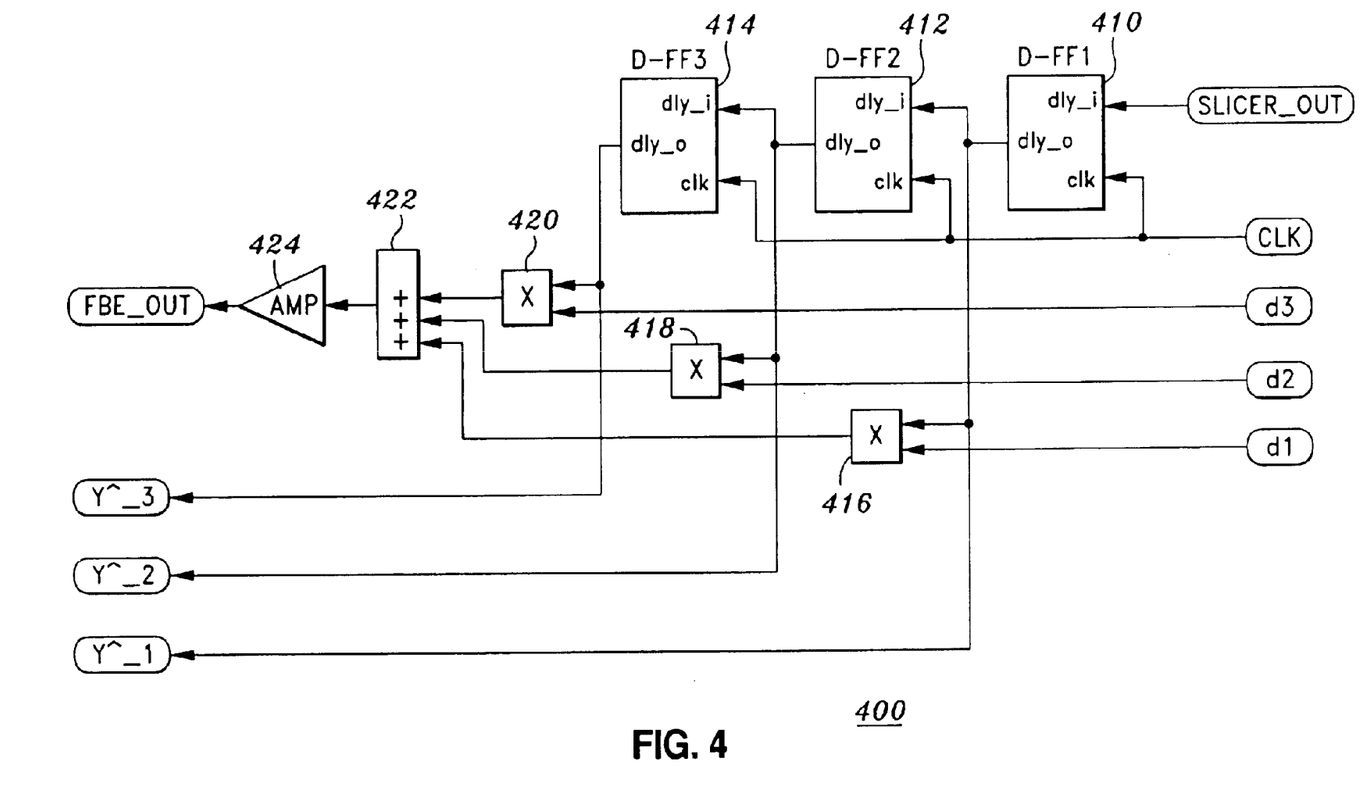
FIG. 4 illustrates a block diagram of a first portion of the FBE of FIG. 2 for generating an output, according to one embodiment of the present disclosure.

FIG. 4 illustrates a block diagram of a first portion 400 of the FBE 218 of FIG. 2 for generating an output, according to one embodiment of the present disclosure. Referring to FIG. 4, the first portion 400 receives as input tap coefficients d1, d2, and d3, the output of the data slicer 216 (SLICER_OUT), and the recovered clock signal CLK. The tap coefficients d1, d2, and d3 initially have fixed values and vary during operation. In one embodiment, the initial fixed values of tap coefficients d1, d2, and d3 are 0.25, 0.25, and 0.5, respectively. However, it is to be appreciated that other values may be selected. The tap coefficients d1, d2, and d3 provide a decimal representation of a real number for simulation purposes. In one embodiment, the tap coefficients may be quantized. In the exemplary embodiment disclosed herein, three tap coefficients (d1, d2, and d3) are utilized in the FBE 218 to provide an effective PR12321 equalization at the data slicer input. It is to be appreciated that a different number of tap coefficient(s) may be used as will be discussed below.

The SLICER_OUT signal is applied to a series of three D flip-flops 410, 412, and 414, where the output of the next D flip-flop stage is delayed by one clock cycle from the output of the previous D flip-flop stage. These delayed bits, labeled as Y^_1, Y^_2, and Y^_3 outputs, are used to determine the next tap coefficient values (see FIG. 6). The outputs of the first, second, and third D flip-flops 410, 412, and 414 are multiplied with tap coefficients d1, d2, and d3, respectively, by multipliers 416, 418, and 420, respectively. The outputs of the multipliers are summed together by adder 422. The output of the adder 422 is coupled to amplifier 424 to provide a normalized output. The output of the amplifier 424, labeled as FBE_OUT, is coupled to the negative terminal of the subtractor 212.

Figure 5:
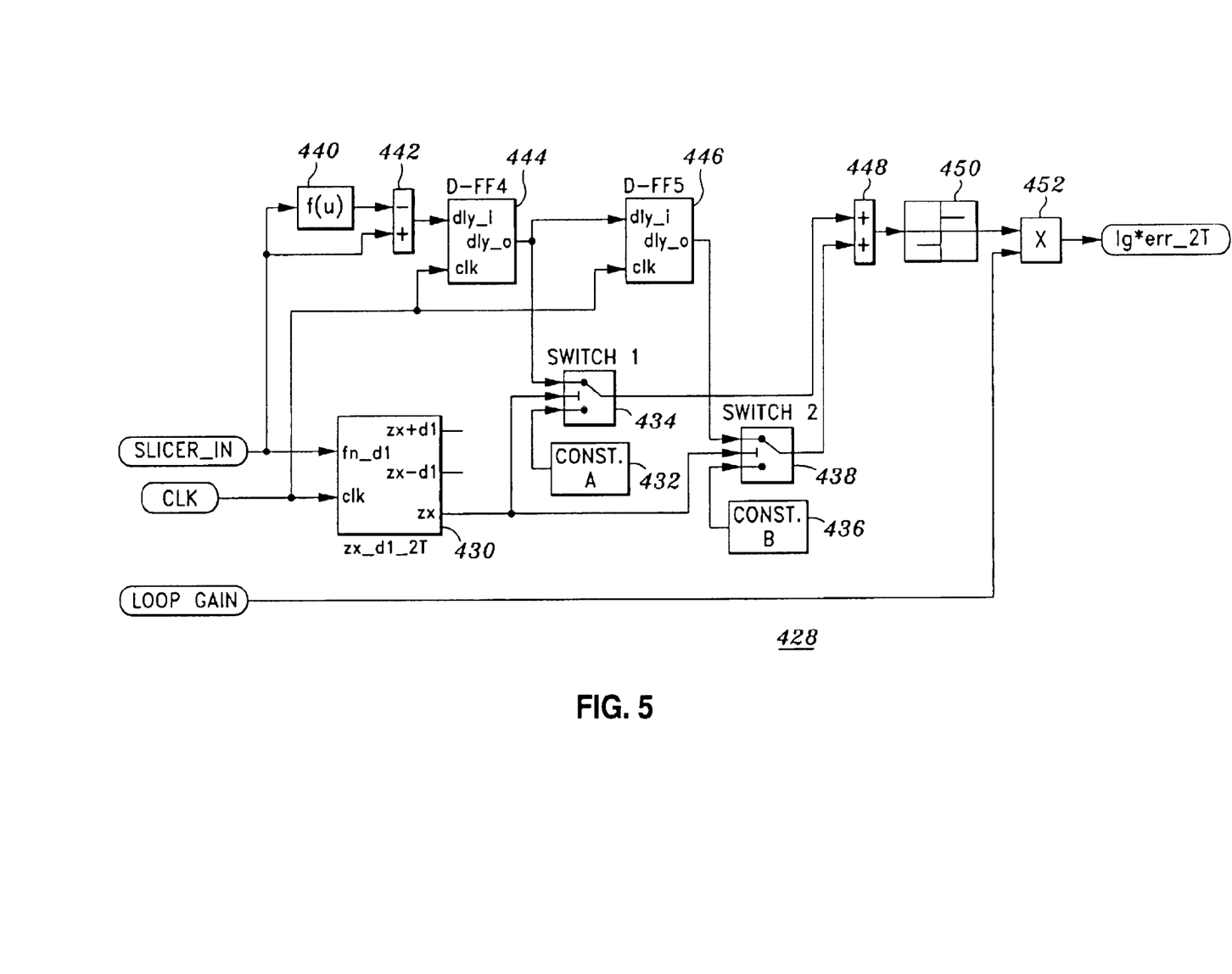
FIG. 5 illustrates a block diagram of a second portion of the FBE of FIG. 2 for generating an error signal, according to one embodiment of the present disclosure.

FIG. 5 illustrates a block diagram of a second portion 428 of the FBE 218 of FIG. 2 for generating an error signal, according to one embodiment of the present disclosure. Referring to FIG. 5, the second portion 428 receives as input the data slicer 216 input (SLICER_IN), clock signal, and loop gain. The SLICER_IN signal is applied to a quantizer block 440 and a positive terminal of a subtractor 442. The quantizer block 440 estimates the slicer input value with ideal values. In one embodiment, the quantizer block 440 estimates the ideal values according to the following formula:

$$\begin{aligned}
u < -8/9 & \quad f(u) = -1 \\
-8/9 < u < -2/3 & \quad f(u) = -7/9 \\
-2/3 < u < -4/9 & \quad f(u) = -5/9 \\
-4/9 < u < 0 & \quad f(u) = -1/3 \\
0 < u < +4/9 & \quad f(u) = +1/3 \\
+4/9 < u < +2/3 & \quad f(u) = +5/9 \\
+2/3 < u < +8/9 & \quad f(u) = +7/9 \\
+8/9 < u & \quad f(u) = +1
\end{aligned} \quad (3)$$

where u is the SLICER_IN signal and f(u) is the ideal value. It is to be appreciated that the quantizer block 440 may use a different formula. The output of the quantizer 440 is coupled to a positive terminal of the subtractor 442. The subtractor 442 subtracts the ideal value (output of quantizer 440) from the real SLICER_IN signal. The output of the subtractor 442 is the error signal e(n). The error signal is then propagated through two D flip-flop stages 444 and 446 to smooth out the error signal. It is to be appreciated that one, three, or more flip-flop stages may be utilized. The output of the first flip-flop 444 is also coupled to a first switch 434 while the output of the second flip-flop 446 is coupled to a second switch 438. The SLICER_IN and clock signals are applied to zero crossings detector 430, which determines zero crossings. In one embodiment, when the polarity of the SLICER_IN and clock signals change, the output of the detector 430 becomes a logic "1." During the zero crossings, the switches 434 and 438 pass the outputs of flip-flops 444 and 446, respectively, to an adder 448 which adds the error signals from the two stages to average out the error signal. At all other times, the output of the comparator 430 is a logic "0" causing switches 434 and 438 to pass constants 432 and 436, respectively, to the adder 448. In one embodiment, the constants 432 and 436 are zero.

The output of adder 448 is coupled to block 450 which determines the sign of the output of adder 448. The output of block 450, which is either 1 or -1, is multiplied by the loop gain at block 452 to provide the output error signal lg*err_2T. The loop gain is typically a fixed value and determines the dynamics and stability of the feedback loop. In one embodiment, the loop gain is a very small number such as 2^-10. In one embodiment, the stochastic gradient algorithm is used to determine the error term e(n). The tap value updating equation for tap j at sample time n is as follows:

$$d^j(n+1) \leftarrow d^j(n) + (\text{loop gain}) \times \{\text{sign of } e(n-L)\} \times (y^\wedge(n-L-j)), \quad (4)$$

where e(n)=slicer input (n)-target slicer input (n) and L is the delay associated with the error signal generation. In the embodiment of FIG. 5, the delay L=2T. It is to be appreciated that the delay L may be different. The symbol y^ represents the delayed slicer output.

Figure 6:
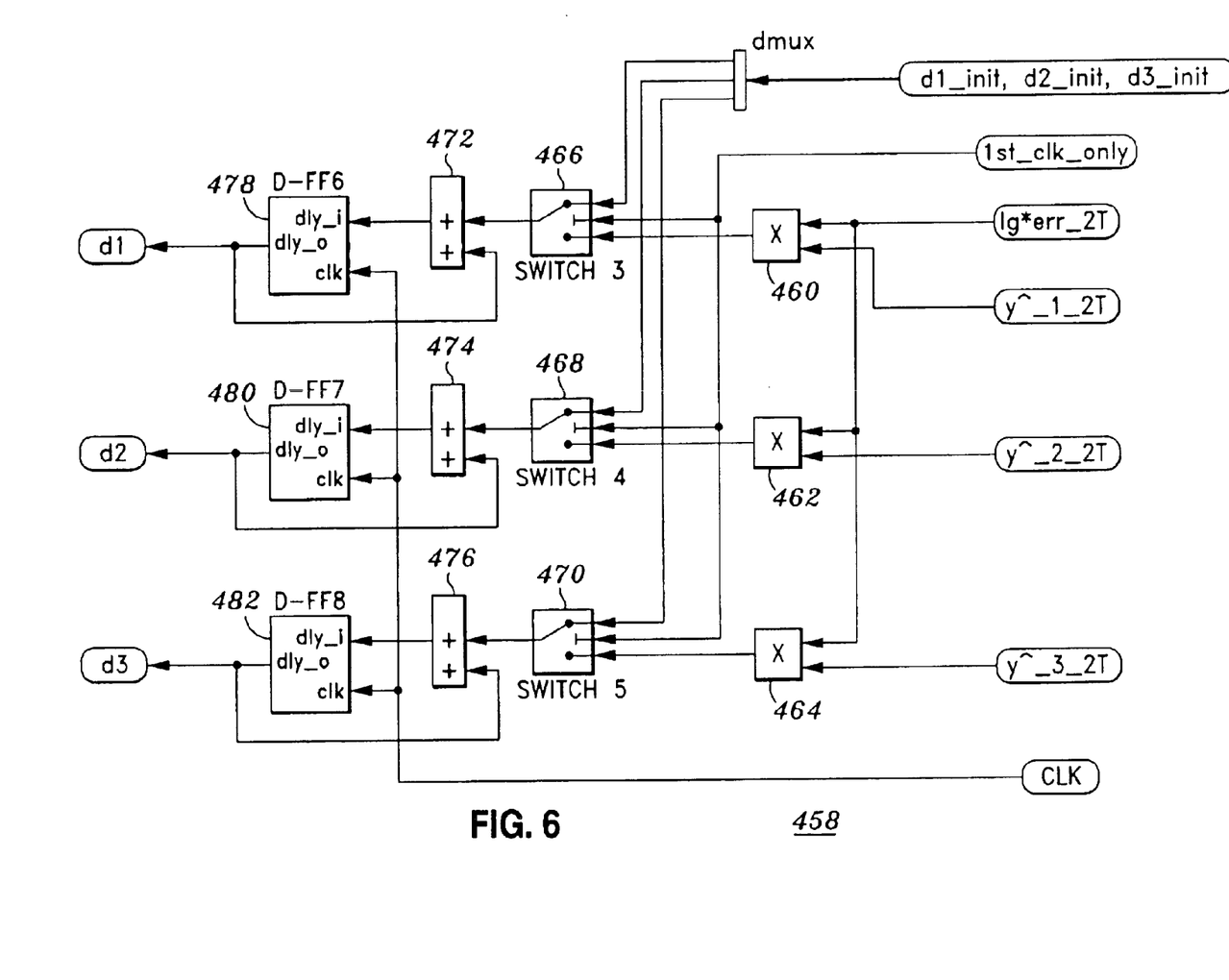
FIG. 6 illustrates a block diagram of a third portion of the FBE of FIG. 2 for generating the tap values, according to one embodiment of the present disclosure.

FIG. 6 illustrates a block diagram of a third portion 458 of the FBE 218 of FIG. 2 for generating the tap values, according to one embodiment of the present disclosure. Referring to FIG. 6, the third portion 458 of the FBE 218 receives as input the error signal lg*err_2T, generated by the second portion of the FBE 218, delayed bits Y^_1_2T, Y^_2_2T, and Y^_3_2T, generated by the first portion of the FBE 218 and delayed by two clock cycles, and initial tap values d1_init, d2_init, and d3_init. The initial values d1_init, d2_init, and d3_init are fixed and in one embodiment are 0.25, 0.25, and 0.5, respectively. During the first clock cycle, when the system is first started, switches 466, 468, and 470 pass the initial fixed values d1_init, d2_init, and d3_init, respectively, to the adders 472, 474, and 476. The adders 472, 474, and 476 add the previous output of the adders with the current input. The adders 472, 474, and 476 are coupled to D flip-flops 478, 480, and 482, respectively, which act as accumulators. After the system settles down, the switches 466, 468, and 470 pass the output of the multipliers 460, 462, and 464, respectively, to the adders. The multipliers 460, 462, and 464 multiply the error signal lg*err_2T by the delayed bits Y^_1_2T, Y^_2_2T, and Y^_3_2T, respectively. Thus, the D flip-flops 478, 480, and 482 update the tap values d1, d2, and d3 every data transition.

Figure 7:
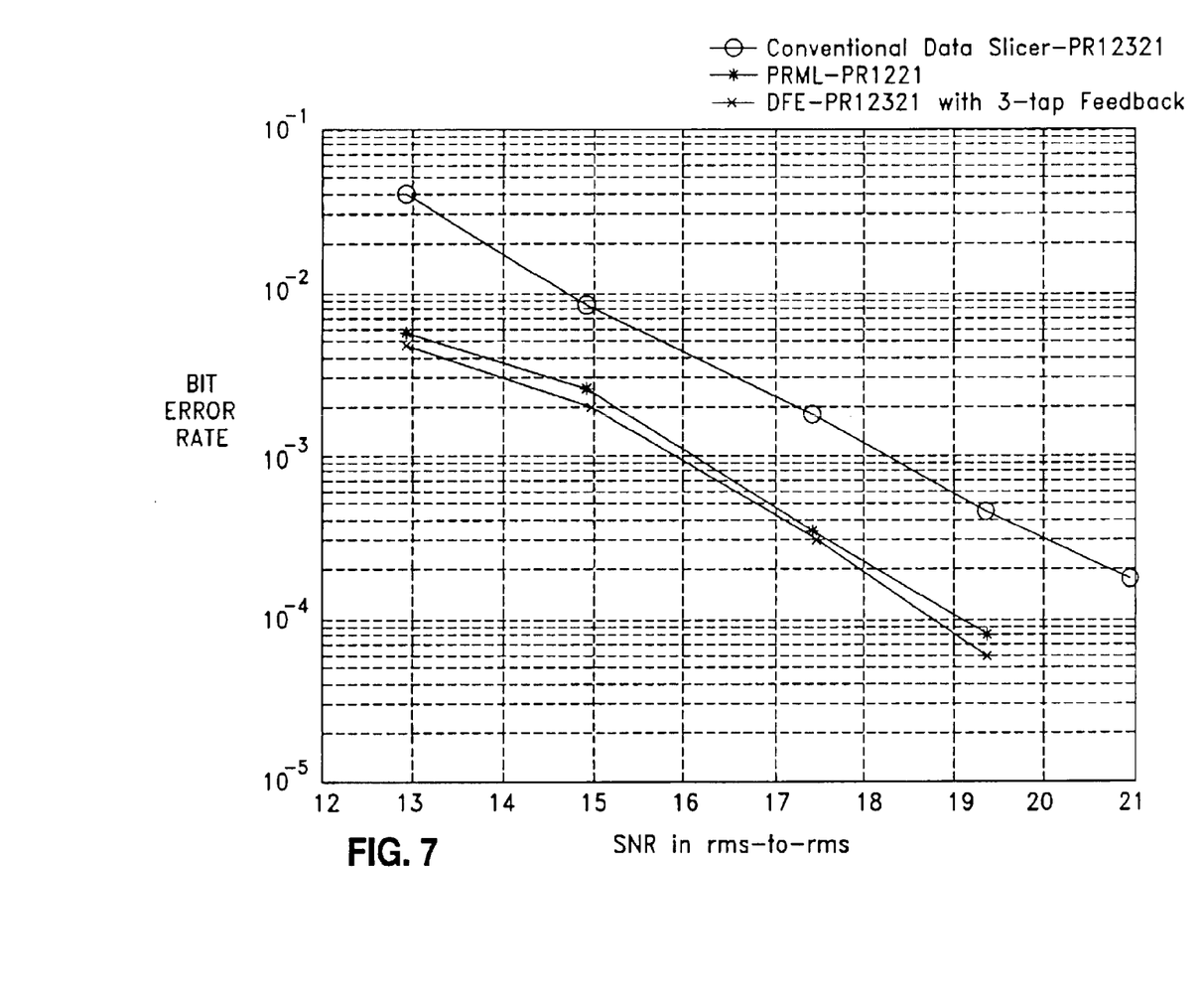
FIG. 7 is a signal to noise ratio versus bit error rate graph for a conventional detector, PRML detector, and decision feedback equalizer of the present disclosure.

FIG. 7 is a signal to noise ratio versus bit error rate graph for a conventional detector, PRML detector, and decision feedback equalizer of the present disclosure. As can be seen, the conventional detector with a transfer function as expressed in equation (1) has the worst signal to noise ratio. The PRML detector has better signal to noise ratio but at the expense of increased and more complicated hardware. The decision feedback equalizer of the present disclosure which, in one embodiment, includes a feed forward equalizer transfer function as expressed in equation (2) and a three tap feedback equalizer which yields an effective PR12321 equalization provides the best signal to noise ratio.

While one major drawback of the DFE technique may be that of error propagation, this drawback becomes a non-issue, for a wide range of signal-to-noise ratios, due to the minimum transition width of three clock cycles in the CD/DVD protocols. That is, a digital signal processor or equivalent controller performs Eight-to-Fourteen (EFM) demodulation for data read from a CD and EFM+ demodulation for data read from a DVD, guaranteeing under such protocols at least two "0's" and at most ten "0's" between "1's". Consequently, any error that may be caused is attenuated due to the minimum transition width of three clock cycles.

One or more embodiments may be implemented as a method, apparatus, system, computer program product, etc. When implemented in software, the elements are essentially the code segments to perform the necessary tasks. The program or code segments can be stored in a processor readable medium or transmitted by a computer data signal embodied in a carrier wave over a transmission medium or communication link. The "processor readable medium" may include any medium that can store or transfer information. Examples of the processor readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc.

While the preceding description has been directed to particular embodiments, it is understood that those skilled in the art may conceive modifications and/or variations to the specific embodiments and described herein. Any such modifications or variations which fall within the purview of this description are intended to be included therein as well. It is understood that the description herein is intended to be illustrative only and is not intended to limit the scope of the invention. Rather the scope of the invention described herein is limited only by the claims appended hereto.

What is claimed is:

1. A decision feedback equalizer in an optical disc system, comprising:

a feedforward equalizer coupled to receive a pickup signal sensed from an optical disc and provide an equalized signal;

a subtractor including a positive input coupled to receive the equalized signal, a negative input, and an output;

a data slicer including an input coupled to receive the output of the subtractor, and an output; and a feedback equalizer including inputs coupled to receive the outputs of the subtractor and the data slicer, and an output coupled to the negative input of the subtractor.

2. The decision feedback equalizer of claim 1 wherein the feedforward equalizer boosts the pickup signal such that the equalized signal resolution is between approximately 20% and 50%.

3. The decision feedback equalizer of claim 1 wherein the feedforward equalizer is a 7-tap frequency impulse response equalizer.

4. The decision feedback equalizer of claim 1 wherein the feedback equalizer is a 3-tap frequency impulse response equalizer.

5. The decision feedback equalizer of claim 1 further comprising an amplifier coupled between the output of the subtractor and the input of the data slicer.

6. The decision feedback equalizer of claim 1 wherein the feedforward equalizer boosts the pick up signal such that the equalized signal resolution is below 50%, and wherein an effective signal at the input of the data slicer has a signal resolution of approximately 50%.

7. An optical system, comprising:

an optical disc;

an optical pickup unit to sense a pickup signal from the optical disk; and a decision feedback equalizer coupled to receive the pickup signal and generate a digital bit stream, said decision feedback equalizer including, a feedforward equalizer to equalize the pickup signal, a subtractor to subtract a feedback signal from the equalized pickup signal and provide a target equalized signal, a data slicer to receive the target equalized signal and generate a digital bit stream, and a feedback equalizer to receive the target equalized signal and the digital bit stream and generate the feedback signal, wherein the target equalized signal has a greater signal resolution than the equalized pickup signal.

8. The optical system of claim 7 further comprising:

a digital signal processor coupled to receive the digital bit stream and process the digital bit stream into one or more formats.

9. The optical system of claim 8 further comprising:

an MPEG decoder coupled to decode data streams from the digital signal processor and generate at least one of an audio and video outputs for playback.

10. The optical system of claim 7 wherein the equalized pickup signal has a signal resolution less than 50% and the target equalized signal has a signal resolution of approximately 50%.

11. The optical system of claim 7 wherein the feedforward equalizer transfer function is $H(D)=2+4D+6D^2+5D^3+3D^4+2D^5$.

12. The optical system of claim 7 wherein the feedback equalizer is a 3-tap frequency impulse response equalizer.

13. The optical system of claim 7 further comprising an amplifier coupled between the subtractor and the data slicer.

* * * * *